W. F. MURPHY.
TUBE.
APPLICATION FILED JUNE 12, 1908.
919,915.  Patented Apr. 27, 1909.
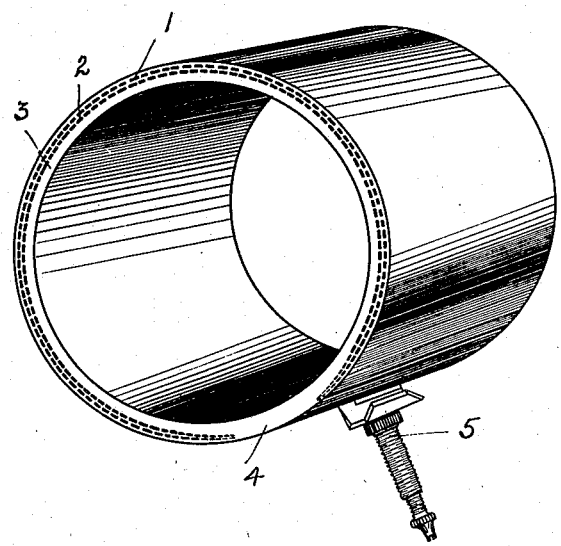
WITNESSES
INVENTOR
William F. Murphy
BY
ATTORNEY

UNITED STATES PATENT OFFICE.

WILLIAM F. MURPHY, OF NEW YORK, N. Y., ASSIGNOR TO CAROLINE O. PRINCE, OF NEW YORK, N. Y.

TUBE.

No. 919,915.

Specification of Letters Patent.

Patented April 27, 1909.

Application filed June 12, 1908. Serial No. 438,047.

*To all whom it may concern:*

Be it known that I, WILLIAM F. MURPHY, a citizen of the United States, and resident of Tompkinsville, borough of Richmond, in the city of New York, county of Richmond, and State of New York, have invented certain new and useful Improvements in Tubes, of which the following is a specification.

My invention relates to improvements in tubes and particularly to that class of flexible inner tubes for use in inflated tires for automobiles and other vehicles.

The object of my invention is to provide a strong and durable flexible tube. I accomplish this object by the device illustrated in the accompanying drawing which shows a perspective view of the device.

I form my tube body preferably of one or more layers of woven partially elastic fabric 1 and 2 and a flexible composition preferably rubber or rubber compound 3 which is forced into the meshes of the fabric in any well known manner and which also forms an outer and an inner covering for the fabric. This construction has considerably greater strength than the layer or layers of rubber alone, that are ordinarily used in tubes for inflated tires. While this construction possesses some elasticity or ability to stretch, yet to provide for a greater amount of stretching both laterally and longitudinally so that the tube may in all cases expand to fit the outer casing I provide that the longitudinal edges of this fabric 1, 2 do not overlap or meet at the inner side of the tube but are separated by a suitable distance, and the longitudinal elastic section 4 of the tube from edge to edge of the fabric is composed of a suitable flexible elastic material such as rubber or rubber composition which may be the same material which forms the inner and the outer faces of the tube, of the same or increased thickness. It is desirable that this longitudinal section 4 be of such width that when stretched the edges of the fabric do not go beyond the marginal edges of the rim.

I find that by the construction above described, greater strength and durability is obtained than in the devices now in use, as the section or part of the tube which bears the greatest strain is not weakened by stretching when the tire is inflated and a proper seat is also obtained for the valve 5.

Having thus described my invention what I claim is:

An inner tube for pneumatic tires constructed of an elastic material solely at that section nearest the rim of the wheel and constructed of rubber and woven partially elastic fabric combined homogeneously for the remaining portion and adapted to expand and contract laterally and longitudinally when inflated to completely fill under pressure the outer casing, substantially as shown and described.

Signed at the city of New York in the county of New York and State of New York this second day of June A. D. 1908.

WILLIAM F. MURPHY.

Witnesses:
WM. LYMAN,
ELEANOR COAKLEY.